United States Patent
Thomas et al.

(10) Patent No.: US 8,667,175 B2
(45) Date of Patent: Mar. 4, 2014

(54) SERVER SELECTION FOR ROUTING CONTENT TO A CLIENT USING APPLICATION LAYER REDIRECTION

(75) Inventors: Anil Thomas, Milpitas, CA (US); Mahesh Chakravarthy Vittal Viveganandhan, Sunnyvale, CA (US); Dipak Punnoran Koroth, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 994 days.

(21) Appl. No.: 12/047,984

(22) Filed: Mar. 13, 2008

(65) Prior Publication Data

US 2009/0234968 A1 Sep. 17, 2009

(51) Int. Cl.
*G06F 15/173* (2006.01)
(52) U.S. Cl.
USPC ............... 709/241; 709/224; 709/238
(58) Field of Classification Search
USPC ........................ 709/238–244, 224
See application file for complete search history.

(56) References Cited

U.S. PATENT DOCUMENTS

| | | | |
|---|---|---|---|
| 4,827,411 A | 5/1989 | Arrowood et al. |
| 4,965,772 A | 10/1990 | Daniel et al. |
| 5,345,586 A | 9/1994 | Hamala et al. |
| 5,414,704 A | 5/1995 | Spinney |
| 5,452,447 A | 9/1995 | Nelson et al. |
| 5,488,412 A | 1/1996 | Majeti et al. |
| 5,506,987 A | 4/1996 | Abramson et al. |
| 5,511,208 A | 4/1996 | Boyles et al. |
| 5,555,244 A | 9/1996 | Gupta et al. |
| 5,586,121 A | 12/1996 | Moura et al. |
| 5,611,049 A | 3/1997 | Pitts |
| 5,673,265 A | 9/1997 | Gupta et al. |
| RE35,774 E | 4/1998 | Moura et al. |

(Continued)

FOREIGN PATENT DOCUMENTS

| | | |
|---|---|---|
| CA | 2430416 | 6/2002 |
| CN | 101971597 A | 2/2011 |

(Continued)

OTHER PUBLICATIONS

Michal Szymaniak, et al. "Scalable Cooperative Latency Estimation", Proceedings of the Tenth International Conference on Parallel and Distributed Systems (ICPADS '04) 1521-9097/04 IEEE, 10 pages.

(Continued)

*Primary Examiner* — Oleg Survillo
(74) *Attorney, Agent, or Firm* — Patent Capital Group (57) ABSTRACT

In one embodiment, a first request is received for a probe link from a client that has downloaded a page. The request is received from an application. A test may be performed to determine a server that could optimally service a content request from the client. After receiving the request, the content router sends a re-direct to the client where the re-direct causes the client to follow the re-direct to the server. The server then sends a re-direct back to the client, which the client follows by sending a second request to the content router. The second request is associated with the client and the round-trip time is calculated for the server. It is then determined if the location for the server should be designated as the content deliverer to the client based on the calculated round-trip time.

16 Claims, 4 Drawing Sheets

(56) References Cited

U.S. PATENT DOCUMENTS

| | | | |
|---|---|---|---|
| 5,740,375 A | 4/1998 | Dunne et al. | |
| 5,751,971 A | 5/1998 | Dobbins et al. | |
| 5,774,660 A | 6/1998 | Brendel et al. | |
| 5,787,470 A | 7/1998 | DeSimone et al. | |
| 5,818,845 A | 10/1998 | Moura et al. | |
| 5,828,655 A | 10/1998 | Moura et al. | |
| 5,848,241 A | 12/1998 | Misinai et al. | |
| 5,852,717 A | 12/1998 | Bhide et al. | |
| 5,859,852 A | 1/1999 | Moura et al. | |
| 5,867,706 A | 2/1999 | Martin et al. | |
| 5,872,773 A | 2/1999 | Katzela et al. | |
| 5,884,025 A | 3/1999 | Baehr et al. | |
| 5,892,903 A | 4/1999 | Klaus | |
| 5,928,331 A | 7/1999 | Bushmitch | |
| 5,941,988 A | 8/1999 | Bhagwat et al. | |
| 5,946,047 A | 8/1999 | Levan | |
| 5,946,048 A | 8/1999 | Levan | |
| 5,950,205 A | 9/1999 | Aviani, Jr. | |
| 5,953,335 A | 9/1999 | Erimli et al. | |
| 5,956,346 A | 9/1999 | Levan | |
| 5,959,660 A | 9/1999 | Levan | |
| 5,959,968 A | 9/1999 | Chin et al. | |
| 5,959,997 A | 9/1999 | Moura et al. | |
| 5,974,547 A | 10/1999 | Klimenko | |
| 5,989,060 A | 11/1999 | Coile et al. | |
| 5,996,021 A | 11/1999 | Civanlar et al. | |
| 6,006,264 A | 12/1999 | Colby et al. | |
| 6,006,266 A | 12/1999 | Murphy et al. | |
| 6,016,388 A | 1/2000 | Dillon | |
| 6,029,175 A | 2/2000 | Chow et al. | |
| 6,052,718 A | 4/2000 | Gifford | |
| 6,064,677 A | 5/2000 | Kappler et al. | |
| 6,092,178 A | 7/2000 | Jindal et al. | |
| 6,131,121 A | 10/2000 | Mattaway et al. | |
| 6,157,942 A | 12/2000 | Chu et al. | |
| 6,167,438 A | 12/2000 | Yates et al. | |
| 6,167,446 A | 12/2000 | Lister et al. | |
| 6,181,679 B1 | 1/2001 | Ashton et al. | |
| 6,182,139 B1 | 1/2001 | Brendel | |
| 6,205,149 B1 | 3/2001 | Lemaire et al. | |
| 6,212,190 B1 | 4/2001 | Mulligan | |
| 6,230,196 B1 | 5/2001 | Guenthner et al. | |
| 6,240,461 B1 | 5/2001 | Cieslak et al. | |
| 6,260,070 B1 | 7/2001 | Shah | |
| 6,298,380 B1 | 10/2001 | Coile et al. | |
| 6,345,294 B1 | 2/2002 | O'Toole et al. | |
| 6,389,462 B1 | 5/2002 | Cohen et al. | |
| 6,446,121 B1 * | 9/2002 | Shah et al. | 709/224 |
| 6,449,647 B1 | 9/2002 | Colby et al. | |
| 6,453,351 B1 | 9/2002 | Endo | |
| 6,463,475 B1 | 10/2002 | Calhoun | |
| 6,477,522 B1 | 11/2002 | Young | |
| 6,505,254 B1 | 1/2003 | Johnson et al. | |
| 6,510,469 B1 | 1/2003 | Starnes et al. | |
| 6,542,468 B1 | 4/2003 | Hatakeyama | |
| 6,578,077 B1 | 6/2003 | Rakoshitz et al. | |
| 6,594,260 B1 | 7/2003 | Aviani, Jr. et al. | |
| 6,601,098 B1 | 7/2003 | Case et al. | |
| 6,606,643 B1 * | 8/2003 | Emens et al. | 709/203 |
| 6,742,044 B1 | 5/2004 | Aviani et al. | |
| 6,757,723 B1 | 6/2004 | O'Toole et al. | |
| 6,891,855 B2 | 5/2005 | Bruckman | |
| 6,920,498 B1 | 7/2005 | Gourlay et al. | |
| 6,922,417 B2 | 7/2005 | Vanlint | |
| 6,992,983 B1 | 1/2006 | Chatterjee | |
| 7,072,979 B1 | 7/2006 | Aviani, Jr. et al. | |
| 7,080,138 B1 | 7/2006 | Baker et al. | |
| 7,117,273 B1 | 10/2006 | O'Toole et al. | |
| 7,143,184 B1 | 11/2006 | Shah et al. | |
| 7,149,771 B1 | 12/2006 | Gifford | |
| 7,171,491 B1 | 1/2007 | O'Toole et al. | |
| 7,185,077 B1 | 2/2007 | O'Toole et al. | |
| 7,225,237 B1 | 5/2007 | Tenereillo | |
| 7,281,036 B1 | 10/2007 | Lu et al. | |
| 7,349,348 B1 | 3/2008 | Johnson | |
| 7,395,348 B1 | 7/2008 | Cieslak et al. | |
| 7,401,159 B1 | 7/2008 | Aviani et al. | |
| 7,444,428 B1 * | 10/2008 | Kuo et al. | 709/242 |
| 7,546,369 B2 | 6/2009 | Berg | |
| 7,624,164 B2 | 11/2009 | Lu et al. | |
| 7,650,376 B1 | 1/2010 | Blumenau | |
| 7,720,997 B1 | 5/2010 | Gourlay et al. | |
| 7,886,023 B1 | 2/2011 | Johnson | |
| 7,899,889 B2 | 3/2011 | Lu et al. | |
| 8,451,745 B2 * | 5/2013 | Weng et al. | 370/252 |
| 2002/0007404 A1 | 1/2002 | Vange et al. | |
| 2002/0112036 A1 | 8/2002 | Bohannon et al. | |
| 2003/0056002 A1 * | 3/2003 | Trethewey | 709/238 |
| 2003/0088671 A1 | 5/2003 | Klinker et al. | |
| 2003/0233478 A1 | 12/2003 | Chuah et al. | |
| 2004/0001444 A1 | 1/2004 | Sadot et al. | |
| 2005/0226196 A1 | 10/2005 | Suh | |
| 2005/0281205 A1 | 12/2005 | Chandwadkar et al. | |
| 2006/0036724 A1 | 2/2006 | Iizuka et al. | |
| 2006/0072620 A1 | 4/2006 | Chatterjee | |
| 2006/0218301 A1 | 9/2006 | O'Toole | |
| 2007/0097987 A1 | 5/2007 | Rey et al. | |
| 2008/0028093 A1 | 1/2008 | Pickens et al. | |
| 2008/0270225 A1 | 10/2008 | Beygelzimer et al. | |
| 2009/0234965 A1 | 9/2009 | Viveganandhan et al. | |
| 2011/0302306 A1 * | 12/2011 | Hanson et al. | 709/224 |
| 2012/0185588 A1 * | 7/2012 | Error | 709/224 |

FOREIGN PATENT DOCUMENTS

| | | |
|---|---|---|
| EP | 1344118 | 9/2003 |
| EP | 1446917 | 8/2004 |
| EP | 2272239 | 1/2011 |
| WO | WO 98/18076 | 4/1998 |
| WO | WO 98/31107 | 7/1998 |
| WO | WO 98/53411 | 11/1998 |
| WO | WO 00/63779 | 10/2000 |
| WO | 0244848 A2 | 6/2002 |
| WO | WO 03/041342 | 5/2003 |
| WO | WO 2009/114558 | 9/2009 |

OTHER PUBLICATIONS

PRC Oct. 15, 2012 SIPO 1st Office Action from Chinese Application No. 200980108421.3; 9 pages.

USPTO Apr. 17, 2012 RCE Response to Jan. 17, 2012 Final Office Action from U.S. Appl. No. 12/406,857.

USPTO Nov. 29, 2011 Response to Apr. 19, 2011 Non-Final Office Action from U.S. Appl. No. 12/406,857.

USPTO Jan. 17, 2012 Final Office Action from U.S. Appl. No. 12/406,857.

"Round-Trip Time Internet Measurements from CAIDA's Macroscopic Internet Topology Monitor," The Cooperative Association for Internet Data Analysis, 4 pages [retrieved and printed on Mar. 23, 2011] http://www.caida.org/research/performance/rtt/walrus0202.

"What is my IP Address Location? Find IP Address Search, IP Locator, IP Lookup," ipaddresslocation.org; 3 pages [retrieved and printed on Mar. 23, 2011] http://www.ipaddresslocation.org/.

EPO Communication mailed Mar. 17, 2011 for EP 09720444.0; 4 pages.

Francis, Paul, et al., "An Architecture for a Global Internet Host Distance Estimation Service," IEEE INFOCOM, Mar. 1999, 17 pages; http://idmaps.eecs.umich.edu/papers/infocom99.ps.gz.

Francis, Paul, et al., "IDMaps: A Global Internet Host Distance Estimation Service," IEEE/ACM Trans. on Networking, Oct. 2001, 14 pages; http://idmaps.eecs.umich.edu/papers/ton01.pdf.

Gueye, Bamba et al., "Constraint-Based Geolocation of Internet Hosts," ACM Internet Measurement SIGCOMM Conference 2004, 14 pages; http://rp.lip6.fr/~gueye/articles/ToN_CBG.pdf.

Jeffery, Clinton L., et al., "Proxy-Sharing Proxy Servers," First Annual Conference on Emerging Technologies and Applications in Communication, May 1996, 4 pages citeseerx.ist.psu.edu/viewdoc/download?doi=10.1.1.38.7942&rep=rep1&type=pdf.

Kwan, Thomas T., et al., "NCSA's World Wide Web Server: Design and Performance," IEEE Computer, 28(11), Nov. 1995; 23 pages.

(56) References Cited

OTHER PUBLICATIONS

Malpani, Radhika, et al., "Making World Wide Web Caching Servers Cooperate," Fourth International World Wide Web Conference, Dec. 1995, 11 pages http://www.w3.org/Conferences/WWW4/Papers/59/.
Oguchi et al., "A Study of Caching Proxy Mechanisms Realized on Wide Area Distributed Networks," IEEE/IEE Publications Ondisc, 1996, [Abstract Only] http://ieeexpolore.ieee.org/xpl/freeabs_all.jsp?arnumber=546215&isnumber=11475.
Padmanabhan, Venkata et al., "An Investigation of Geographic Mapping Techniques for Internet Hosts," Microsoft Research and UC Berkeley, SIGCOMM, San Diego, CA, Aug. 2001; 13 pages; http://reserach.microsoft.com/~padmanab/papers/sigcomm2001.pdf.
Padmanabhan, Venkata et al., "Determining the Geographic Location of Internet Hosts," Microsoft Research and UC Berkeley, SIGCOMM, San Diego, CA, Aug. 2001; 2 pages http://research.microsoft.com/~padmanab/papers/sigmetrics2001.pdf.
PCT International Search Report mailed Jul. 12, 2000 for PCT/US00/09377; 1 page.
PCT International Search Report mailed Jul. 15, 1998 for PCT/US97/23728; 2 pages.
Ross, Keith, "Hash Routing for Collections of Shared Web Caches," Sep. 1997; IEEE Network, 21 pages http://citeseerx.ist.psu.edu/viewdoc/similar?doi32 10.1.1.13.821&type=ab.
USPTO Apr. 19, 2011 Non-Final Office Action from U.S. Appl. No. 12/406,857; 19 pages.
Wong, Bernard et al., "Geolocalization on the Internet through Constraint Satisfaction," Worlds '06 Technical Sessions, $3^{rd}$ Usenix Workshop on Real, Large Distributed Systems, Nov. 5, 2006; 6 pages; http://www.usenix.org/events/worlds06/tech/prelim_papers/wong/wong/html.
Amini, L. et al., "Client Clustering for Traffic and Location Estimation," Distributed Computing Systems 2004 Proceedings, $24^{th}$ Annual Conference on Distributed Computing Systems (ICDCS '04), pp. 730-737 [Abstract Only] http://ieeexplore.ieee.org/ie15/9016/28619/01281641.pdf?arnumber=1281641&htry=2.
Jul. 18, 2011 Response to EPO Communication dated Mar. 17, 2011 from European Patent Application No. P09720444.0; 11 pages.
Barzilai et al., "Design and Implementation of an RSVP-Based Quality of Service Architecture for an Integrated Services Internet," IEEE Journal on Selected Areas of Communications, Apr. 1998, 21 pages; http://citeseerx.ist.psu.edu/viewdoc/summary?doi=10.1.1.51.5755.
Fei, Zongming et al., "A Novel Server Selection Technique for Improving the Response Time of a Replicated Service," In Proc. of INFOCOM '98, Apr. 1998, 22 pages.
Guyton, James et al., "Locating Nearby Copies of Replicated Internet Servers," In Proc. Of SIGCOMM '95, Aug. 1995, 19 pages.
Information Sciences Institute, "Transmission Control Protocol—DARPA Internet Program—Protocol Specification," RFC 793, Internet Engineering Task Force, Sep. 1981; 89 pages; http://www.ietf.org/rfc/rfc0793.txt.
Martin, Arlitt et al., "Evaluating Content Management Techniques for Web Proxy Caches," Apr. 30, 1999, 10 pages; http://citeseerx.ist.psu.edu/viewdoc/similar?doi=10.1.1.17.4901&type=ab.

Meyer et al., "Generic Routing Encapsulation (GRE)," RFC 2784; Internet Engineering Task Force, Mar. 2000, 10 pages; http://tools.ietf.org/html/rfc2784.
Mockapetris, P., "Domain Names—Concepts and Facilities," RFC 1034, Internet Engineering Task Force, Nov. 1987, 55 pages; http://www.rfc.editor.org/rfc/pdfrfc/rfc1034.txt.pdf.
Ousterhout, John K., "A Trace-Driven Analysis of the UNIX 4.2 BSD File System," Jan. 2, 1993, Computer Science Division, Electrical Engineering and Computer Science, University of California, Berkeley, CA, pp. 1-10.
Ousterhout, John K., "Beating the I/O Bottleneck: A Case for Log-Structured File Systems," Jan. 30, 1992, Computer Science Division, Electrical Engineering and Computer Sciences, University of California, Berkeley, CA, pp. 1-17; Abstact Only.
Perkins, Charles E., "Service Location Protocol for Mobile Users," IEEE, Indoor and Mobile Radio Communications, Sep. 8-11, 1998, pp. 141-146.
Valloppillil, Vinod, "Cache Array Routing Protocoi v1.0," Jun. 30, 1997, Internet Draft, http://ds1.internic/net/internet-drafts/draft-vinod-carp-v1-00.txt, pp. 1-6.
Veizades, J. et al., "The Service Location Protocol," RFC 2165, Jun. 1997, pp. 1-72; http://tools.ietf.org/html/rfc2165.
Welch, Brent, "A Comparison of the Vnode and Sprite File System Architectures," Proceedings of the USENIX File System Workshop, May 1992, 18 pages; http://citeseerx.ist.psu.edu/viewdoc/summary?doi=10.1.1.46.1535.
Wessels et al., "ICP and the Squid Web Cache," IEEE Journal on Selcted Areas of Communications, Apr. 1998, pp. 345-357; http://citeseerx.ist.psu.edu/viewdoc/summary?doi=10.1.1.108.9934.
Yang et al., "An Effective Mechanism for Supporting Content-Based Routing in Scalable Server Clusters," IEEE Parallel Processing. Sep. 21, 1999, pp. 240-245; Abstract Only.
Baentsch, Michael, et a., "Introducing Application-Level Replication and Naming into Today's Web," Fifth International World Wide Web Conference, May 1996; 11 pages http://www.geckil.com/~harvest/www5/papers/P3/overview.html.
Baker, S.M. et al., "Distributed Cooperative Web Servers," Computer Networks, Elsevier Science Publishers, May 17, 1999, 18 pages, http://citeseerx.ist.psu.edu/viewdoc/summary?doi=10.1.1.42.7990.
EPO Search Report mailed Jul. 29, 2005 for Application No. 01986029.5 (published as EP 1344118); 5 pages.
Katz, E.D., et al., "A Scalable HTTP Server: The Ncsa Prototype," Computer Networks and ISDN Systems, vol. 27, pp. 155-164, 11 pgs., 1994 http://citeseerx.ist.psu.edu/viewdoc/summary?doi=10.1.1.34.5762.
PCT International Search Report mailed Nov. 6, 2009 for PCT/US2009/036704 (published as WO 2009/114558); 4 pages.
PCT International Search Report mailed Dec. 23, 2002 for PCT/US02/35158 (published as WO 2003/041342); 1 page.
PCT International Search Report mailed Jun. 13, 2002 for PCT/US01/44500 (published as WO 02/44848); 4 pages.
Notification of Transmittal (1 page) of International Preliminary Report on Patentability (1 page) and Written Opinion of the International Searching Authority (7 pages) mailed Sep. 14, 2010 for PCT/US2009/036704 (published as WO 2009/114558).
Postel J., "Telnet Protocol Specification," RFC 0764, Jun. 1980, 16 pages; http://tools.ietf.org/pdt/rtc764.pdf.

* cited by examiner

SERVER SELECTION FOR ROUTING CONTENT TO A CLIENT USING APPLICATION LAYER REDIRECTION

TECHNICAL FIELD

Particular embodiments generally relate to content delivery systems.

BACKGROUND

A content delivery network (CDN) is a distributed network of content delivery nodes. The content delivery nodes serve content to one or more clients requesting the content. The content delivery nodes are usually dispersed across many geographical locations. For example, one node may be located in New York and another may be located in San Francisco.

If a large multimedia file is downloaded, choosing a non-optimal location to serve the content may lead to a large penalty of content delivery. For example, a large amount of data will have to be transported across more network links. This may cause delay in serving the content to the user. For example, if a user is in San Francisco and the New York server is selected, additional latency may be experienced than if the server in San Francisco was selected and the content will have to be transported all the way from New York to San Francisco unnecessarily, thereby causing inefficient utilization of Service Provider networks.

DETAILED DESCRIPTION OF EMBODIMENTS

Overview

Particular embodiments generally relate to determining a server for delivering content.

In one embodiment, a first request is received for a probe link from a client that has downloaded a page. The request is received from an application. A test may be performed to determine a server that could optimally service a content request from the client. For example, round trip times are calculated for different servers, and the round trip time determined to be the most optimal for the client is selected. After receiving the request, the content router sends a re-direct to the client where the re-direct causes the client to follow the re-direct to the server. The server then sends a re-direct back to the client, which the client follows by sending a second request to the content router. The second request is associated with the client and the round-trip time is calculated for the server. For example, the round trip time is based on a time when the re-direction link was sent and the second request is received. It is then determined if the location for the server should be designated as the content deliverer to the client based on the calculated round-trip time. For example, multiple locations are tested and the location with the lowest round trip time may be selected as the content deliverer.

Particular embodiments use application layer re-direction to determine a server. For example, a hypertext transfer protocol (HTTP) re-direction is used to cause the client to send a re-direct to the server. The server then responds to the re-direction, which then causes the client to send a second request back to the server. Accordingly, an application layer solution is provided that can measure the round-trip time and determine a location that may be optimal to deliver content to the user.

Example Embodiments

Figure 1:
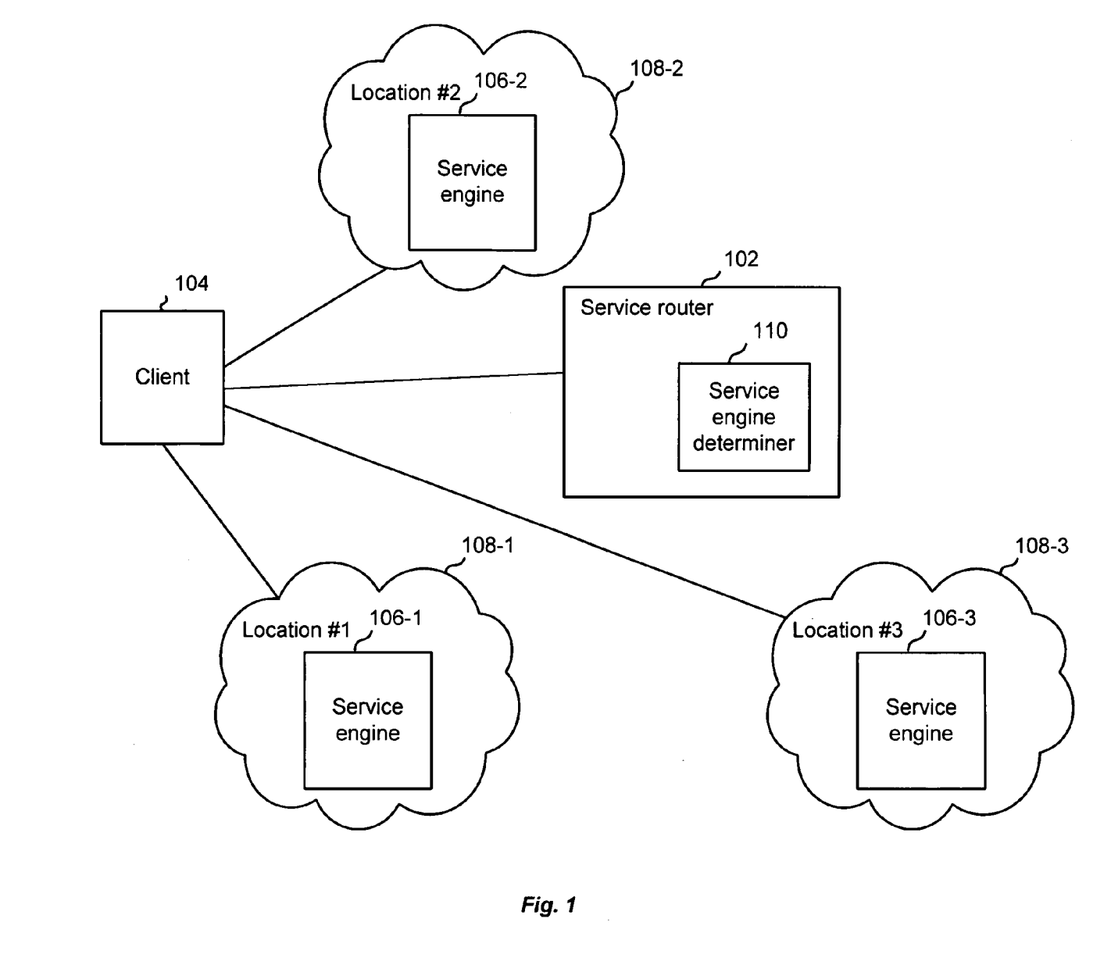
FIG. 1 depicts an example of a system for delivering content according to one embodiment.

FIG. 1 depicts an example of a system 100 for delivering content according to one embodiment. As shown, a content router 102, a client 104, and a plurality of servers 106 are provided. Servers 106 may be found in various locations 108, which may be geographically dispersed.

Content router 102 is configured to determine a location 108 that should be the content deliverer for client 104. Content router 102 is a device that intercepts client requests directed at a CDN (Content Delivery Network). It is the job of the content router to ensure that content is fetched from a server in a location that is optimal with respect to the client. For example, a closest location to client 104 may be selected. Although the closest location is described, it will be understood that other factors may be used to determine which server 106 is the optimal server to deliver content to client 104. For example, a server 106 may be closest to client 104, but a network to deliver the content from the location may be experiencing low bandwidth throughput or may have failed. Thus, another server 106 that is not the closest but can deliver the content faster may be determined as the optimal server to deliver the content.

Servers 106 may be any devices that can deliver content. For example, servers 106 can include network devices that can deliver content to client 104. In one example, content may be replicated on servers 106 in different locations 108 in a content delivery network. Depending on location 108, content may be delivered with different latencies to client 104. For example, it is expected that a server 106 that is closest to client 104 may be able to deliver the content the fastest to client 104. Also, other factors may be taken into account, such as the bandwidth available for the network, network failures, etc.

Client 104 includes a computer that may be using a browser to download pages, such as web pages. The web page may be a portal that allows a user to download content. When the user requests content, client 104 may send a request to content router 102.

Location 108 may include multiple servers 106. For example, location 108 may be a server farm or data center that includes multiple routers that can deliver content. The description describes using a server to determine a round trip time. The server may be determined as a representative of location 108 and is used as a basis for determining the round trip time. It will be understood that when the content is delivered, any server in the chosen location may be used.

As will be described below, a server determiner 110 may have already selected a location 108 that should deliver content to client 104 before the user requests the content. This decision may be determined in advance of a user requesting the content.

Server determiner 110 uses an application layer solution that can determine a location 108 to deliver the content to client 104. As will be described in more detail below, an application of client 104 may send a request for a probe link to content router 102. Content router 102 then selects a server 106 for a location 108. A server determiner 110 may then send a re-direction request, such as a hypertext transfer protocol (HTTP) re-direct to client 104. This causes client 104 to re-direct the message to a server 106. Server 106 then sends a re-direct back to the client, which causes the client to send a second request to content router 102. Server determiner 110 can then determine the round-trip time it took for the messages to be sent and received. From that, server determiner 110 may determine if server 106 should be selected to deliver content. For example, the above process may be performed for a number of servers 106 in multiple locations 108. The server 106 that has the lowest round-trip time may be selected as the content deliverer. Other factors may be taken into account, such as bandwidth, to determine a server 106 to deliver content the fastest.

Figure 2:
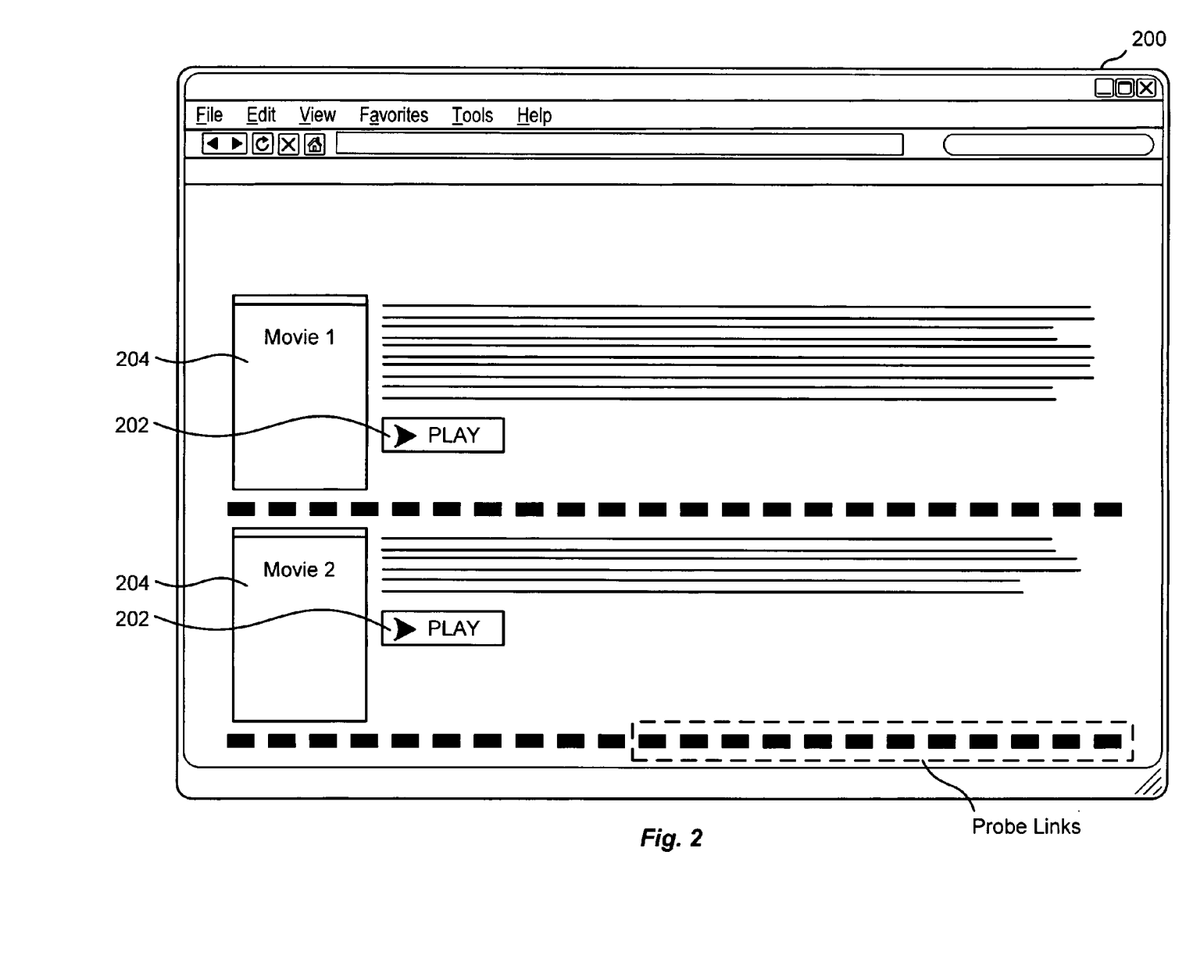
FIG. 2 depicts an example of a page that can be downloaded by a browser of client 104 according to one embodiment.

FIG. 2 depicts an example of a page 200 that can be downloaded by a browser of client 104 according to one embodiment. Although page 200 is shown, it will be understood that any page may be downloaded by client 104. In one example, page 200 may be a portal that lists content that can be played by the user. As shown, buttons 202 are provided that allow a user to play content 204. In this case, different movies may be played. When a user selects button 202, the user expects that the content should be played almost immediately. For example, the user may expect that content should be played within 2 seconds. If a delay occurs in starting the content, the user may become disinterested and cancel the download.

After a user chooses an item to play, depending on the type of uniform resource locator (URL) that points to the content, an HTTP GET or real-time streaming protocol (RTSP) DESCRIBE is generated by a client application of client 104. The request goes to content router 102 and content router 102 re-directs client 104 to the appropriate server 106. To minimize latency experienced by the user, the content routing decision is made in advance, before the play request is received. Thus, instead of waiting for the play request (either the HTTP GET or RTSP DESCRIBE), the content routing decision may be performed when page 200 is first loaded on a browser of client 104. In one case, the content delivery network does not know when a portal page is downloaded, which means content router 102 does not know when the page is loaded. However, the page may include probe links 106 within it. The probe links point to content router 102 such that it is contacted when the page is loaded.

Probe links 206 may be links that cause client 104 to send a request for a probe link to content router 102. Probe links 206 may be rendered as images or can be invisible (e.g, by having the image be a single pixel or by having an image with a single color that is the same color as the page background). For example, when an image is downloaded in page 200, it causes an application to send a request for a probe link to be sent to content router 102. For example, the probe link may be an HTTP request that is sent. Also, the probe links may be invisible and embedded in code for page 200. When the code is downloaded, a probe link request may be sent to content router 102.

While the user is browsing page 200 by looking at the content selections, content router 102 may determine the content routing decision in the background. By the time the user selects an item to play, it is possible that content router 102 has made a content routing decision, such as content router 102 may have selected a server 106 to deliver content to client 104. For example, content router 102 may have paired the user's Internet protocol (IP) address with a location 108. The mapping between client 104 and location 108 may be saved in a database. When the request is received, client 104 can be re-directed to location 108 to request the content. This allows a server 106 at the location to deliver content to client 104 in a low latency environment.

Although page 200 is described, a user may access content in other ways. For example, a user may select a media link that was received by email. In this case, the link (URL) may point directly to the content file. When content router 102 receives this URL from a client 104 that it has never seen before, a sequence of redirections are triggered to find out the optimal server 106. Once the server is determined, the content is served from the optimal location and all subsequent requests from the same client can now be redirected to the same location. Content router 102 pairs up client 104 with a location 108 and records this mapping in its database for future requests. Future requests from client 104 do not need to go through the server determination process because a database lookup is used to determine the optimal location 108. The database entries may be invalidated after a configured time interval, after which content router 102 goes through the same determination again for the same client.

Figure 3:
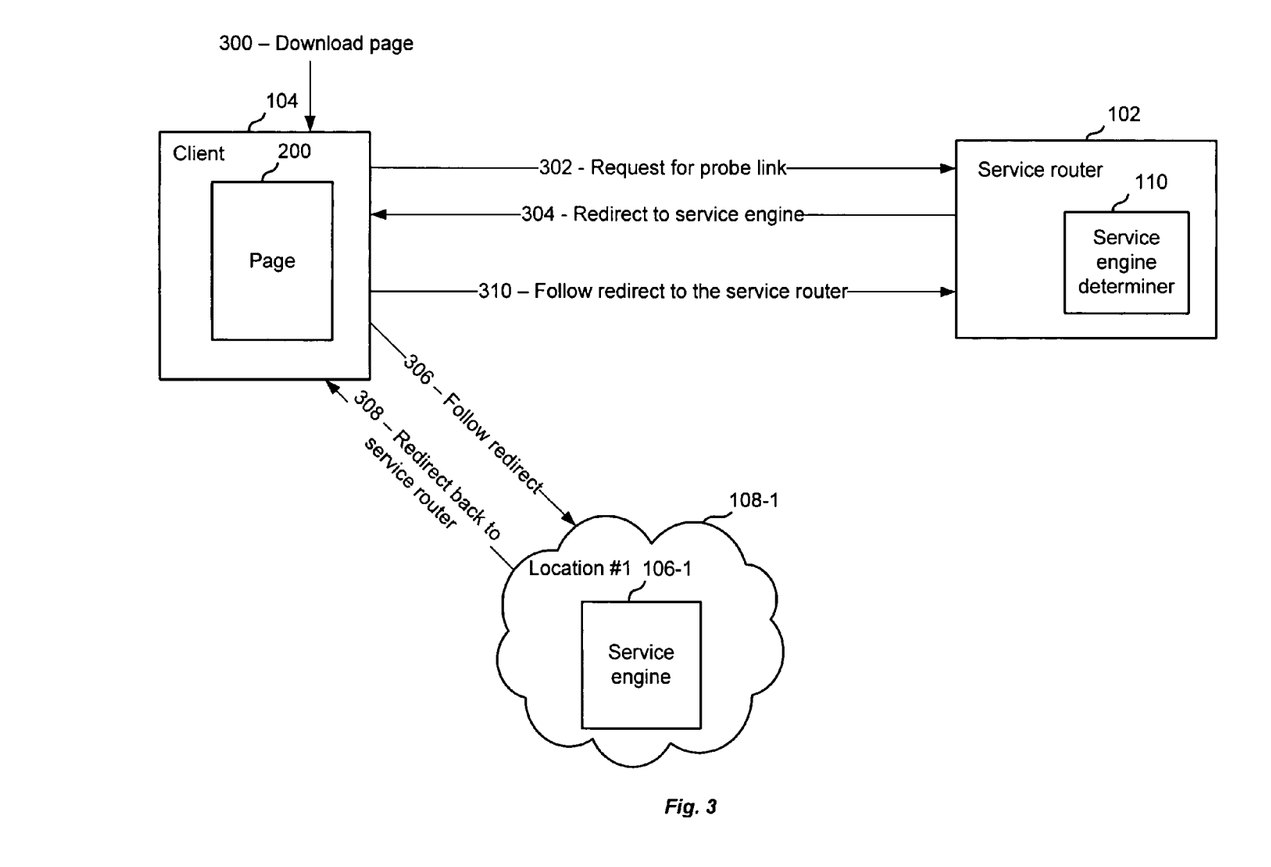
FIG. 3 provides a more detailed example of a data flow in the system according to one embodiment.

FIG. 3 provides a more detailed example of a data flow in system 100 according to one embodiment. The following process may be performed for multiple servers 106 in multiple locations 108. As shown at 300, client 104 may download a page 200. The probe links are downloaded as part of the page 200. At 302, a request for the probe link is sent to content router 102. In one example, requests for multiple probe links may be sent. For example, probe links for three locations may be sent to content router 102. In one example, the probe link may be an HTTP request, such as HTTP address contentrouter/probe. This may send a request for a probe link to content router 102. Server determiner 110 may store an identifier or IP address for client 104. This is later used to associate a second request received from client 104 for determining the round trip time.

At 304, content router 102 determines a location 108 to test and determines a server 106 as a representative. Content router 102 then sends a re-direction message to client 104 that re-directs the client to the selected server 106. For example, an HTTP re-direct, such as status code 307, is sent to client 104. A location field in the re-direct may contain a special uniform resource identifier (URI) that points to a server 106 that is to be probed. This causes client 104 to initiate an HTTP connection with that server 106. It should be noted that the re-direction is an HTTP request from content router 102 to client 104. This may be different than a ping, which might not always work. This is because a client may be behind a firewall and a naked ping from client 104 to content router 102 may not pass through the firewall. Rather, the ping is sent through a port that may not allow the ping. However, an HTTP re-direction to the client in response to the request probe link will pass through the firewall. The ping program depends on Internet control messaging program (ICMP) echo requests to determine round-trip times. A number of Internet Service Providers filter out ICMP echo requests at their boundaries. Particular embodiments use application layer protocol mechanisms such as HTTP or RTSP redirects, thus the requests can pass through unfiltered.

Also, with regard to firewalls, the requests are initiated by client 104 and the firewalls are required not to block the rest of the transaction. The redirect sequence is triggered by client 104 requesting for a probe link and the client establishes a transfer control protocol (TCP) connection with content router 102 and makes a request. The response (a redirect command) from content router 102 to client 104 is passed through to client 104 on the same TCP connection. Firewalls recognize the redirect command as part of the same TCP transaction and let the redirect pass. The redirections from servers 106 are also recognized and passed.

The re-direct causes client 104 to follow the re-direct and initiate an HTTP connection with server 106 at 306. For example, the re-direct sent to client 104 is re-directed to server 106-1. Server 106-1 detects the special URI, which causes it to send a re-direct back to client 104 at 308. This re-direct is followed back to content router 102. For example, client 104 may send an HTTP message: contentrouter/probe to content router 102. This process may be performed for all probe links that are requested. For example, server 106-2 and server 106-3 may also be probed with the above probing of server 106-1. Content router 102 associates an identifier with client 104 and can then calculate the round trip time using a time based on when a previous message was sent. In one example, a round-trip time for each server 106 is calculated. The time elapsed from the initial re-direct at 304 to when the second request from client 104 is received at 310 may be calculated. This may measure the round-trip time between server 106 and client 104. This round-trip time may include the time it took to send the messages from content router 102 to client 104 and from client 104 to content router 102. However, assuming that this time is the same for all servers 106, then it can be included in the calculation.

When multiple locations 108 have been tested, server determiner 110 may then determine an optimal server 104 (or location) to assign as the content deliverer. For example, a location that server determiner 110 determines to be a location that can deliver the content the fastest to client 104 is determined. Different round trip times for servers 106 may be compared and the most optimal location is determined based on the round trip times. A location 108 with the least round-trip time may be determined as the location that should be selected to deliver content to client 104.

In some cases, the optimal location may be better indicated by bandwidth than latency. The bandwidth may be measured by having the probe links point to a dummy HTML file of a suitable size. Over a high bandwidth path, the file will download faster causing a corresponding location 108 to provide a download faster. However, server 106 cannot respond to a GET request by issuing both a 200 OK and a 307-re-direct. Thus, an alternative mechanism to re-direct client 104 back to content router 102 after the probe file has been transferred may be needed. In one example, the probe link on the portal page would be <iframe src="http://contentrouter/probe.html"><iframe>. When client 104 requests for probe-.html from content router 102, it is re-directed to the HTTP address server-in-location1/dummy.html. This file, located on the server 106, may be:

```
<html>
<body>
<!--
Invisible dummy data. Fill to the desired size...
...
...
-->
<img src="http://contentrouter/probe.jpg"></img>
</body>
</html>
```

When the file is requested for, the HTTP response from servers uses standard header fields to prevent caching of content. For example, an HTTP response from server 106 has a Cache-Control field set to no-Cache such that dummy.html is not cached anywhere. Loading the above file causes client 104 to contact the content router to request probe.jpg. At this time, content router 102 can compute the round-trip time, which includes the download time for dummy.html.

The probing process may be performed in series or in parallel. For the series process, client 104 may request the probe links in series. For example, once one round-trip has been completed, a second request for a probe link may be sent. If the requests are sent in parallel, the first response from server 106 may be considered to have the least round-trip time, and thus this server 106 may be selected as the server to deliver content to client 104. There is no need to wait for the rest of the locations to finish the race. Thus, the time required to make a content routing decision is minimized.

In the sequential embodiment, only one probe link may be provided on page 200. Content router 102 may probe servers 106 one-by-one by re-directing the same request for the probe link multiple times. When there are many locations, this may cause the number of re-directions to go over the maximum number supported by the browser of client 104. Accordingly, multiple probe links may be provided on page 200 to allow for multiple sequential re-directions.

Also to avoid the redirection limit, a single probe link may fan out into multiple probes. This may be achieved by crafting the single probe as an in-line frame. For example, the probe link on the portal page may be <iframe src="http://contentrouter/probe"></iframe>, and the page at the HTTP address contentrouter/probe may look like

```
<html>
<body>
<img src="http://contentrouter/probe1"></img>
<img src="http://contentrouter/probe2"></img>
<img src="http://contentrouter/probe3"></img>
</body>
</html>
```

Thus, loading the portal page results in three probe links being requested by client 104, that is probe 1, probe 2, and probe 3. This also decouples page 200 from the internals of the content deliver network. For example, page 200 does not need to be modified for having a new location to be probed.

When the in-line frame is requested, content router 102 may respond with a page containing probes that point to individual servers 106. This avoids one round-trip from the client to the content router. In this case, the page at HTTP address contentrouter/probe may be:

```
<html>
<body>
<img src="http://server-in-location1/probe"></img>
<img src="http://server-in-location2/probe"></img>
<img src="http://server-in-location3/probe"></img>
</body>
</html>
```

Also, probe links may not be used on page 200. In this case, the media request that downloads the page may download probe links, which case the re-direct steps before serving the actual content. The user may experience added latency in this case but only for the first request for the page. RTSP requests may also be ping-ponged using the RTSP re-direct messages.

Client 104 may also go through one or more intermediate proxies before reaching content router 102. If this happens, content router 102 may not be able to determine the IP address of client 104. Content router 102 may believe the request originated at the proxy because the proxy acts like it is client 104. This may not allow content router 102 to reliably identify later requests from client 104 to determine the round-trip time. That is, content router 102 needs to determine when the first request was received from a client and associate it with the second request to determine the round-trip time.

When a proxy is used, content router 102 may service the request for a probe link and generate an identifier for client 104. This identifier may be sent to client 104 in the form of an HTTP cookie. Content router 102 records the content routing decision in its database as a mapping between the identifier and the chosen location 108. The next time client 104 requests content from content router 102, client 104 sends over the cookie, which can be used to perform the database look-up using the identifier. This may provide the location that has been selected for client 104.

Figure 4:
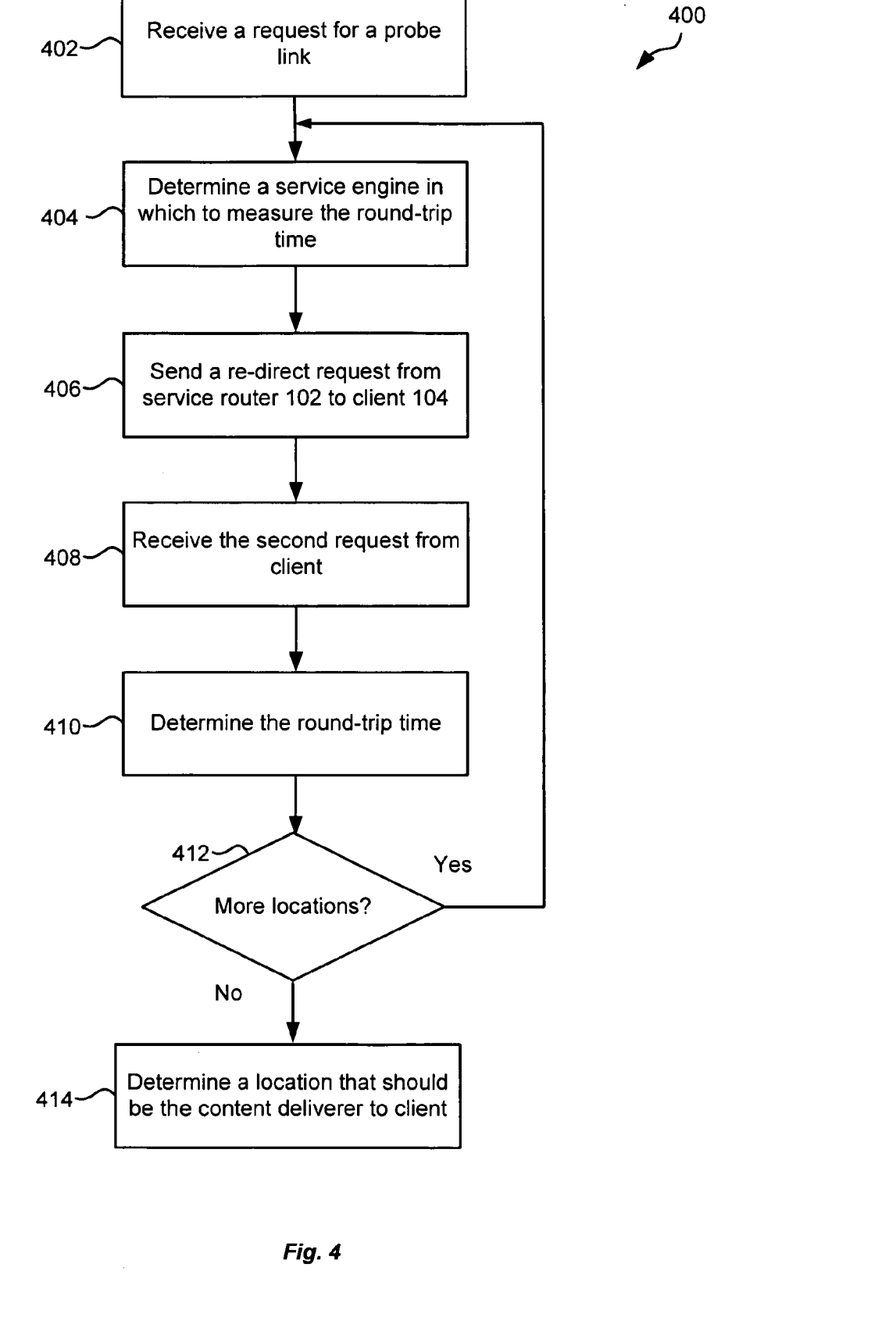
FIG. 4 depicts a simplified flowchart of a method for determining content routing decisions according to one embodiment.

FIG. 4 depicts a simplified flowchart 400 of a method for determining content routing decisions according to one embodiment. Step 402 receives a request for a probe link. The probe link may be received from client 104 at content router 102.

Step 404 determines a server 106 in which to measure the round-trip time. For example, a server at a location 108 may be determined.

In step 406, a re-direct request is sent from content router 102 to client 104. The request re-directs client 104 to server 106. Server 106 also sends a re-direction back to client 104 which causes it to send a second request to content router 102. In step 408, content router 102 receives the second request from client 104.

In step 410, content router 102 determines the round-trip time.

This process may be performed for multiple servers. Step 412 determines if more locations 108 should be probed. If so, the process reiterates to step 406 where other re-directs are sent. If more locations 108 do not need to be probed, step 414 determines a location 108 that should be the content deliverer to client 104. This may be the location 108 that is closest to client 104 or may have the most bandwidth.

Particular embodiments provide many advantages. For example, extra latency is not added to a request for content. Rather, the content routing decision is performed before the user requests the content. Also, no layer 3 or layer 4 enhancements are required. Also, no domain name service (DNS) support is needed. Rather, an application layer solution is provided where an application at client 104 initiates the probe link request. By using re-directions, the presence of firewalls is not a problem. This is because content router 102 is responding to a request from client 104.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:

receiving, by a content router, a plurality of first requests sent by an application of a client that has initiated downloading of a page containing a plurality of probe links that trigger the application to follow each of the probe links by sending the plurality of first requests, wherein the plurality of probe links are provided as images of pixels on the page, and wherein each probe link corresponds to a different geographic location hosting a plurality of servers;

determining, by the content router, a particular server in each server location associated with a corresponding probe link of the plurality of probe links, the server location being a location at which the particular server could service a content request from the client;

sending, by the content router, a plurality of redirect messages to the client, each redirect message being associated with the corresponding probe link and causing the client to:

follow the redirect message to the particular server in the server location, receive back a redirect response from the particular server, and return a second request to the content router upon receipt of the redirect response, wherein an Internet protocol (IP) address of the client is associated with the second request for determining a roundtrip time for each particular server;

associating, by the content server, each of the second requests with the corresponding probe link of the plurality of probe links;

calculating, by the content router, a roundtrip time for each of the particular servers based on elapsed time from the redirect message that was sent from the content router to when the second request is received from the client; and designating, by the content router, a server location with the lowest calculated roundtrip time as a content deliverer to the client.

2. The method of claim 1, wherein the redirect message is a HyperText Transfer Protocol (HTTP) redirect.

3. The method of claim 1, wherein at least one of the plurality of probe links is provided as an image of a single pixel or as an image with a single color that is the same color as the page background.

4. The method of claim 1, wherein the redirect message passes through a client's firewall.

5. The method of claim 1, wherein the application is a web browser application and the page is a portal that allows the client to download content.

6. The method of claim 1, wherein the plurality of first requests are HTTP requests.

7. The method of claim 1, wherein the redirect message causes a file to be downloaded from the particular server in each server location.

8. The method of claim 1, wherein the designating further comprises pairing the IP address of the client with the server location having the lowest calculated roundtrip time.

9. One or more non-transitory media encoding logic that includes code that, when executed by a processor of a content router, is programmed to:

receive a plurality of first requests sent by an application of a client that has initiated downloading of a page containing a plurality of probe links that trigger the application to follow each of the probe links by sending the plurality of first requests, wherein the plurality of probe links are provided as images of pixels on the page, and wherein each probe link corresponds to a different geographic location hosting a plurality of servers;

determine a particular server in each server location associated with a corresponding probe link of the plurality of probe links, the server location being a location at which the particular server could service a content request from the client;

send a plurality of redirect messages to the client, each redirect message being associated with the corresponding probe link and causing the client to:
follow the redirect message to the particular server in the server location,
receive back a redirect response from the particular server, and
return a second request to the content router upon receipt of the redirect response, wherein an Internet protocol (IP) address of the client is associated with the second request for determining a roundtrip time for each particular server;

associate each of the second requests with the corresponding probe link of the plurality of probe links;

calculate a roundtrip time for each of the particular servers based on elapsed time from the redirect message that was sent from the content router to when the second request is received from the client; and designate a server location with the lowest calculated roundtrip time as a content deliverer to the client.

10. The media of claim 9, wherein the redirect message is a HyperText Transfer Protocol (HTTP) redirect.

11. The media of claim 9, wherein at least one of the plurality of probe links is provided as an image of a single pixel or as an image with a single color that is the same color as the page background.

12. The media of claim 9, wherein the redirect message passes through a client's firewall.

13. The media of claim 9, wherein the application is a web browser application and the page is a portal that allows the client to download content.

14. The media of claim 9, wherein the plurality of first requests are HTTP requests.

15. The media of claim 9, wherein the redirect message causes a file to be downloaded from the particular server in each server location.

16. The media of claim 9, wherein the designating further comprises pairing the IP address of the client with the server location having the lowest calculated roundtrip time.

* * * * *